United States Patent [19]
Yurjevich et al.

[11] Patent Number: 5,448,910
[45] Date of Patent: Sep. 12, 1995

[54] PORTABLE TIRE UNIFORMITY TEST MACHINE

[75] Inventors: Martin A. Yurjevich, North Canton; David A. Johnson, Wadsworth; James F. Siegfried, Medina; William P. Stanfield, Cuyahoga Falls; Donald E. Andrews, Jr., Mogadore, all of Ohio

[73] Assignee: Bridgestone/Firestone, Inc., Akron, Ohio

[21] Appl. No.: 206,991

[22] Filed: Mar. 7, 1994

[51] Int. Cl.$^6$ ............................................. G01M 17/02
[52] U.S. Cl. ............................................. 73/146; 73/8
[58] Field of Search ........................... 73/146, 865.8, 8

[56] References Cited

U.S. PATENT DOCUMENTS

| | | | |
|---|---|---|---|
| 4,691,564 | 9/1987 | Potts et al. | 73/146 |
| 4,829,815 | 5/1989 | Kuzas | 73/146 |
| 4,969,355 | 11/1990 | Doi et al. | 73/146 |
| 5,027,649 | 7/1991 | Himmler | 73/146 |
| 5,040,413 | 8/1991 | Ohms | 73/146 |
| 5,107,703 | 4/1992 | Ota | 73/146 |
| 5,111,687 | 5/1992 | Hill | 73/146 |
| 5,323,646 | 6/1994 | Poling, Sr. | 73/146 |

*Primary Examiner*—Richard E. Chilcot, Jr.
*Assistant Examiner*—Eric S. McCall
*Attorney, Agent, or Firm*—David A. Thomas

[57] ABSTRACT

A portable machine for testing on site the uniformity of a tire or other components of a tire/wheel assembly. A compact rigid frame has a base formed by a plurality of longitudinal and transverse frame members for supporting the machine on a planar surface. A box-like subframe is mounted on the base and supports a mounting plate for the tire/wheel assembly. The mounting plate is slidably mounted on a pair of slide rods extending upwardly from the subframe. A road wheel and drive motor are mounted on the base, with the motor being mounted within the subframe and the load wheel being located beneath the tire/wheel assembly mounting plate. An air spring raises and lowers the mounting plate for placement and removal of a tire/wheel assembly thereon. A loading mechanism applies a force on the tire/wheel assembly mounting plate to forceably move a tire into contact with the road wheel, and is measurable by a first load cell. A second load cell is mounted on a spindle of the tire/wheel assembly mounting plate and measures forces exerted on the tire along five separate axes. A probe located adjacent a tire being tested transmits signals to an electronic processing unit which generates a graphic display of the tire's uniformity.

18 Claims, 7 Drawing Sheets

PORTABLE TIRE UNIFORMITY TEST MACHINE

BACKGROUND OF THE INVENTION

TECHNICAL FIELD

The present invention relates to a machine for the testing of tires. More particularly, the invention relates to a portable machine which may transported relatively easily to a site, such as an automotive plant, to determine the uniformity of tire/wheel assemblies and/or components thereof, and in particular, the uniformity of tires. More particularly, the invention relates to a such a machine having a relatively small, compact and sturdy frame containing various loading features thereon, for performing the tire uniformity tests.

BACKGROUND INFORMATION

The dynamic behavior of pneumatic tires has long been determined to ensure that undesirable forces are not created on the tire during use due to any irregularities present in the tire which can occur during manufacturing, such as out of roundness. These dynamic tests have heretofore been performed at a designated test site or laboratory, usually located at the tire manufacturing plant. The tests are performed by machines having an extremely large rotatable road wheel which is driven at one or more speeds, in which the tire being tested is moved into engagement with the road wheel and has a predetermined pressure exerted thereon, as well as various angles of contact with the road wheel. Various equipment is mounted on or adjacent the machine and tire for gathering data as the tire is rotated by the road wheel. The road wheels of these prior art machines are usually several feet in diameter and weigh thousands of pounds, and are mounted either on massive support frames or in a sunken pit below the floor line, with only a top portion of the road wheel being exposed for engagement by the tire being tested.

However, problems often develop in the field, such as at an automotive production plant where a finished vehicle is being tested and vibration is detected. This vibration may or may not be the result of the tire/wheel assembly or a component thereof, namely, the rim or the tire mounted thereon. It is extremely time consuming to remove the rim and/or tire and ship it to a remote laboratory test site for subsequent testing since all subsequent vehicles produced at the plant may contain the same vibration-causing problem, which may or may not be in the tire/wheel assembly.

Therefore, the need has existed for an improved tire uniformity test machine which is portable so that it can be transported easily to a remote location, such as an automobile assembly plant, and used for measuring the uniformity of a tire/wheel assembly or the individual components thereof, without sacrificing the accuracy and results obtained thereby.

SUMMARY OF THE INVENTION

Objectives of the invention include providing an improved portable tire uniformity test machine which has a rugged, compact frame, which can be transported to a remote site, and which contains all of the necessary apparatus and equipment for the dynamic testing of a tire/wheel assembly or component thereof, in order to determine the dynamic behavior of the tire and/or rim of the tire/wheel assembly.

A further objective is to provide such a machine which will provide a graphical display of the various test results and measurements instantaneously at the job site.

A still further objective is to provide such a machine which is considerably less expensive than current non-portable equipment, yet which provides the desired test results without sacrificing accuracy.

Another objective is to provide such a machine which is provided with a mechanism for applying various desired forces on the tire; in which the machine contains one or more load cells, depending upon the results desired to be obtained during the test; and in which the machine can be operated with minimal personnel, and which requires only a relatively level surface for supporting the equipment and a source of electric power for energizing the drive motor and test data equipment.

These objectives and advantages are obtained by the improved portable uniformity tire test machine, the general nature of which may be stated as including a frame having a base formed by a plurality of connected longitudinal and transverse frame members lying in a common plane for supporting the machine on a substantially horizontal planar surface, a box-like subframe mounted on the base and extending upwardly therefrom, and a slide subassembly mounted on the subframe and extending therefrom; a tire/wheel assembly mounting plate slidably mounted on the slide subassembly; means for moving the tire/wheel assembly mounting plate on the slide subassembly; a road wheel rotatably mounted on the base; a motor mounted on the base and drivingly engaged with the road wheel for rotating said road wheel; and load means for moving the tire/wheel assembly mounting plate toward the road wheel to apply a measurable pressure between a tire of a tire/wheel assembly mounted on said mounting plate and the road wheel.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
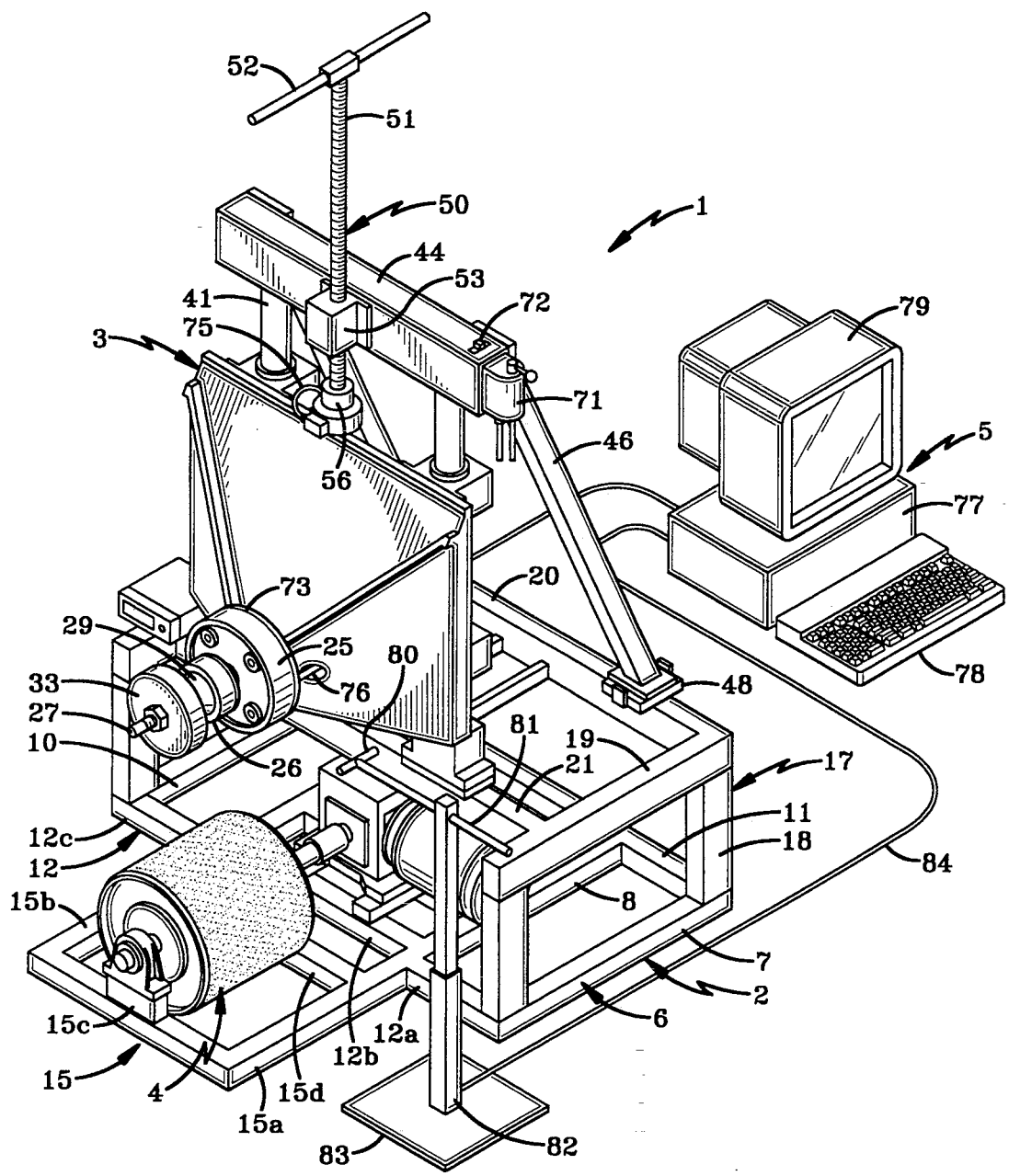
FIG. 1 is a perspective view of the portable tire uniformity test machine of the invention including the various electronic processing and display apparatus.

The improved portable tire uniformity test machine of the invention is indicated generally at 1, and is shown in assembled operating position in FIG. 1. Machine 1 includes as its main components, a unique, compact, sturdy frame indicated generally at 2, a tire/wheel assembly mounting plate indicated generally at 3, a road wheel 4, and electronic processing apparatus indicated generally at 5.

Figure 2:
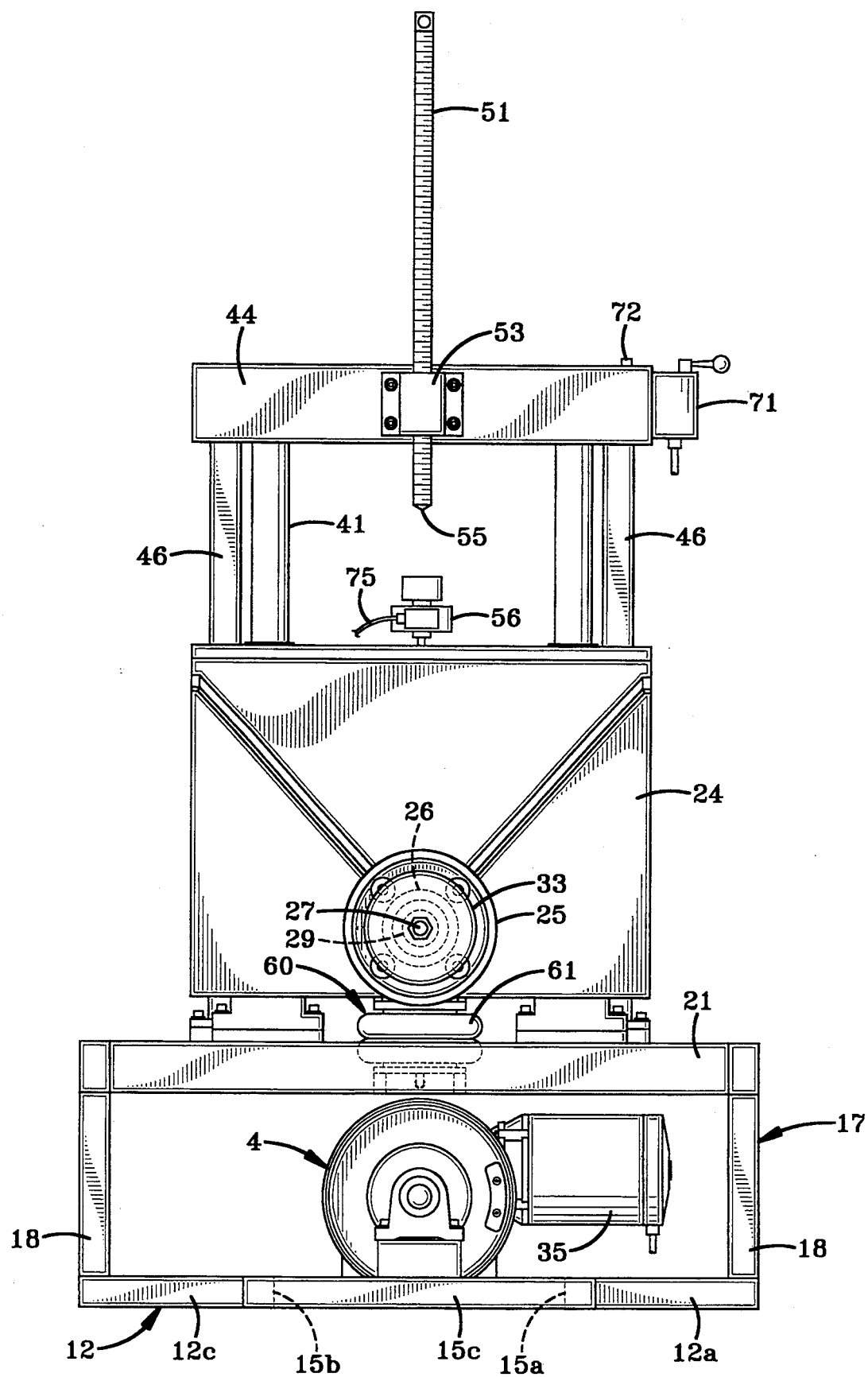
FIG. 2 is a front elevational view of the test machine of FIG. 1 with the electronic processing and display apparatus removed therefrom.

Frame 2 is formed by a plurality of longitudinally and transversely extending frame members, preferably formed of hollow rectangular cross-sectional steel members. In the preferred embodiment, frame 2 includes a base 6 for supporting the machine on a generally flat planar surface. Base 6 includes four spaced parallel longitudinally extending base members 7, 8, 9 and 10 which are joined by transversely extending back and front frame members 11 and 12, respectively. Front frame member 12 is formed by three separate frame member sections 12a, 12b and 12c (FIGS. 1 and 2).

A base extension, indicated generally at 15, is formed by a pair of spaced parallel longitudinally extending frame members 15a and 15b (FIG. 1), and spaced parallel transversely extending front and rear frame members 15c and 15d. Rear frame member 15d is spaced from and parallel with transverse frame member 12b.

A box-like subframe, indicated generally at 17, is mounted on base 6 and includes four corner frame members 18 which are mounted on the ends of longitudinal base members 7 and 8 and extend vertically upwardly therefrom. Subframe 17 further includes a pair of longitudinally extending top end members 19 and a pair of spaced transversely extending parallel end members 20 and 21 to form the box-like configuration of subframe 17.

Figure 3:
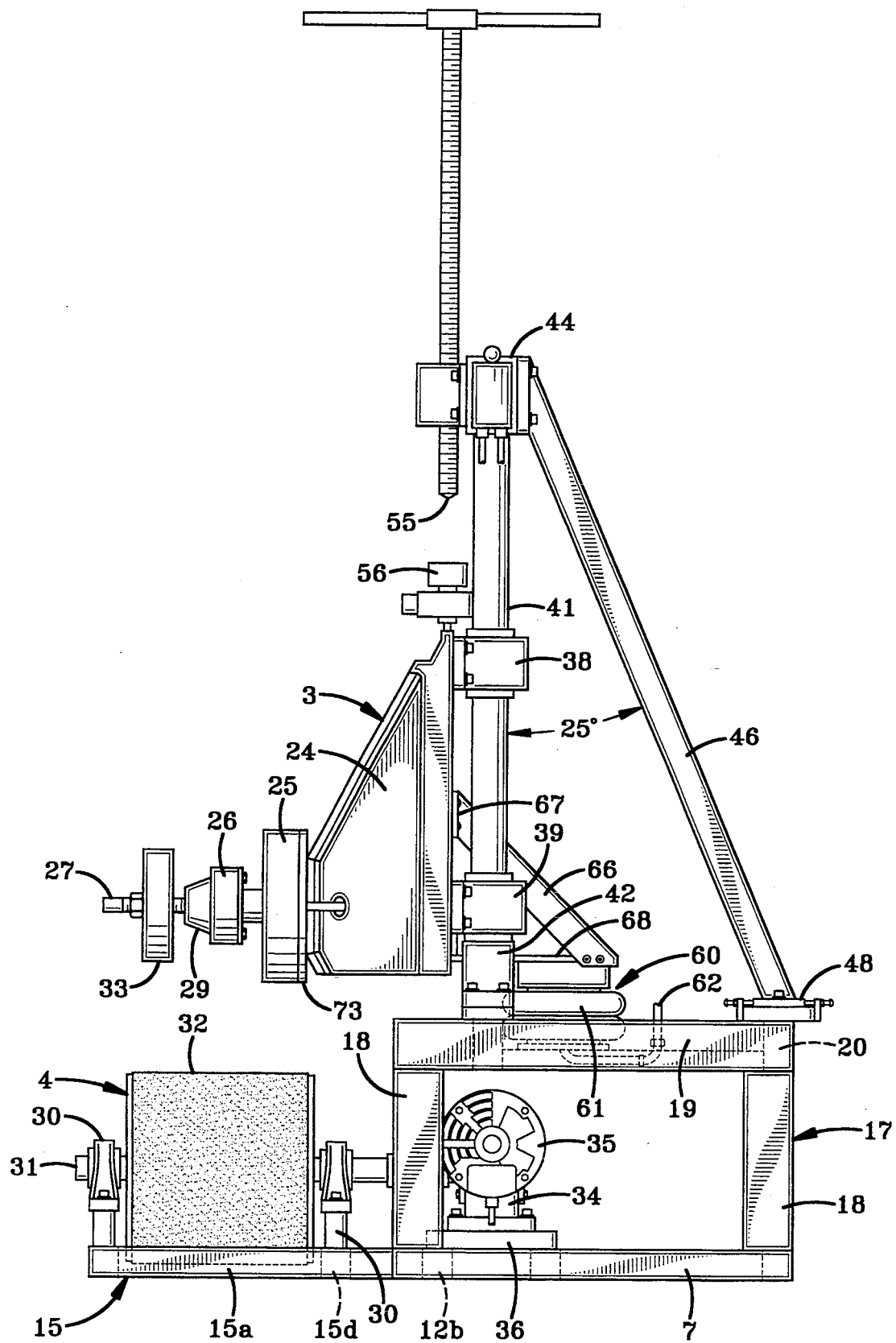
FIG. 3 is a right side elevational view of the test machine shown in FIG. 2.

Tire/wheel assembly mounting plate 3 has a generally triangular configuration, with a planar back surface 23 (FIG. 4) and a triangular front surface 24 on which is rotatably mounted a tire rim backing plate 25. Plate 25 preferably is located at the apex of the triangular mounting plate. A bearing hub assembly 26, a centering cone 29, and a locking hub 33 are mounted on a threaded spindle 27, which is mounted on and extends outwardly from rim backing plate 25. Road wheel 4 is rotatably mounted beneath rim backing plate 25 on a pair of pillow blocks 30 (FIG. 3) which rotatably support road wheel shaft 31 therein in suitable bearings. Road wheel 4 preferably has a roughened outer surface 32 to provide for frictional engagement when a tire 58 is brought into pressing engagement therewith. In the preferred embodiment, road wheel 4 will have a diameter of approximately one foot which is considerably less than the heretofore road wheels used at fixed test sites having a diameter of several feet.

Road wheel shaft 31 is connected through a gear box 34 (FIG. 4) to a drive motor 35 which extends in a cantilever fashion outwardly from gear box 34. Gear box 34 in turn is mounted on a pair of cross braces 36 which extend across transverse cross members 11 and 12b and is located within subframe 17, therefore decreasing the size and providing compactness for frame 2.

Tire/wheel assembly mounting plate 3 is slidably mounted by upper and lower spaced pairs of bearing blocks 38 and 39, which are secured to back surface 23 thereof, and are slidably engaged with a pair of vertically extending spaced slide rods 41. Slide rods 41 are mounted on and extend upwardly from pedestals 42 which are bolted to the top frame members of subframe 17. The top ends of slide rods 41 are secured adjacent the ends of a horizontal cross member 44 to provide lateral stability to the slide rods.

A pair of angularly extending reinforcing struts 46 are connected by attachment plates 47 to cross member 44 at their upper end and by mounting pads 48 at their lower end to end frame member 20 of subframe 18. In order to increase the compactness of frame 2, struts 46 form an included angle with guide rods 41 of approximately 25°.

A manually operated loading mechanism indicated generally at 50, is mounted on cross member 44 and is engageable with tire/wheel assembly mounting plate 3. In the preferred embodiment, loading mechanism 50 consists of a threaded rod 51 having a handle 52. Rod 51 extends through a threaded block 53 which is mounted on cross member 44. End 55 of threaded shaft 51 (FIG. 2) is rotatably advanced by manual rotation of handle 52 into engagement with a load cell 56 which will measure the amount of force applied to mounting plate 3 and, correspondingly, the force that tire 58 exerts on road wheel 4. However, if desired, loading mechanism 50 can be replaced with a pneumatic, hydraulic, electrical or other type of mechanical loading device without departing from the concept of the invention.

Figure 4:
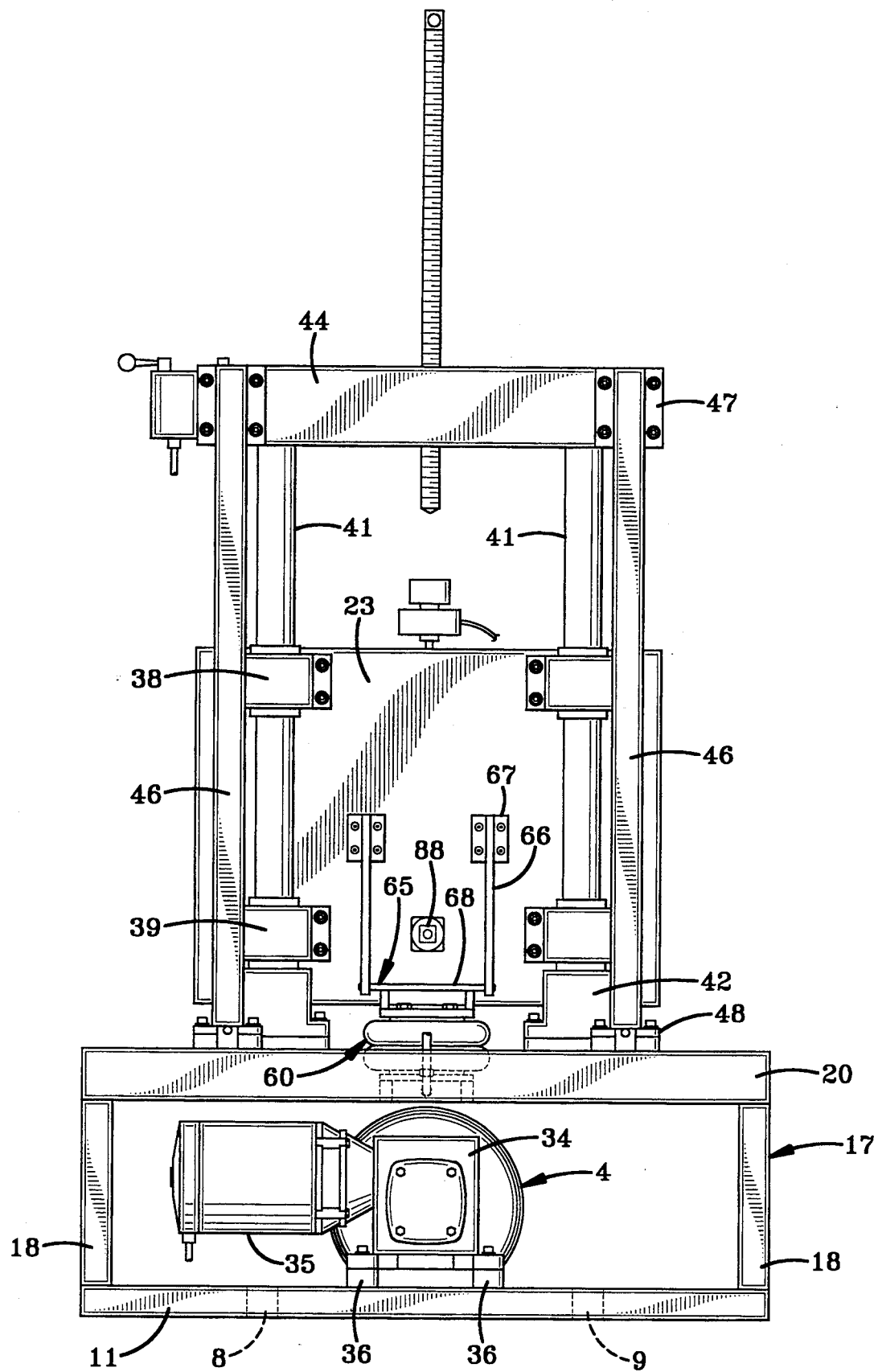
FIG. 4 is a back elevational view of the test machine.
Figure 5:
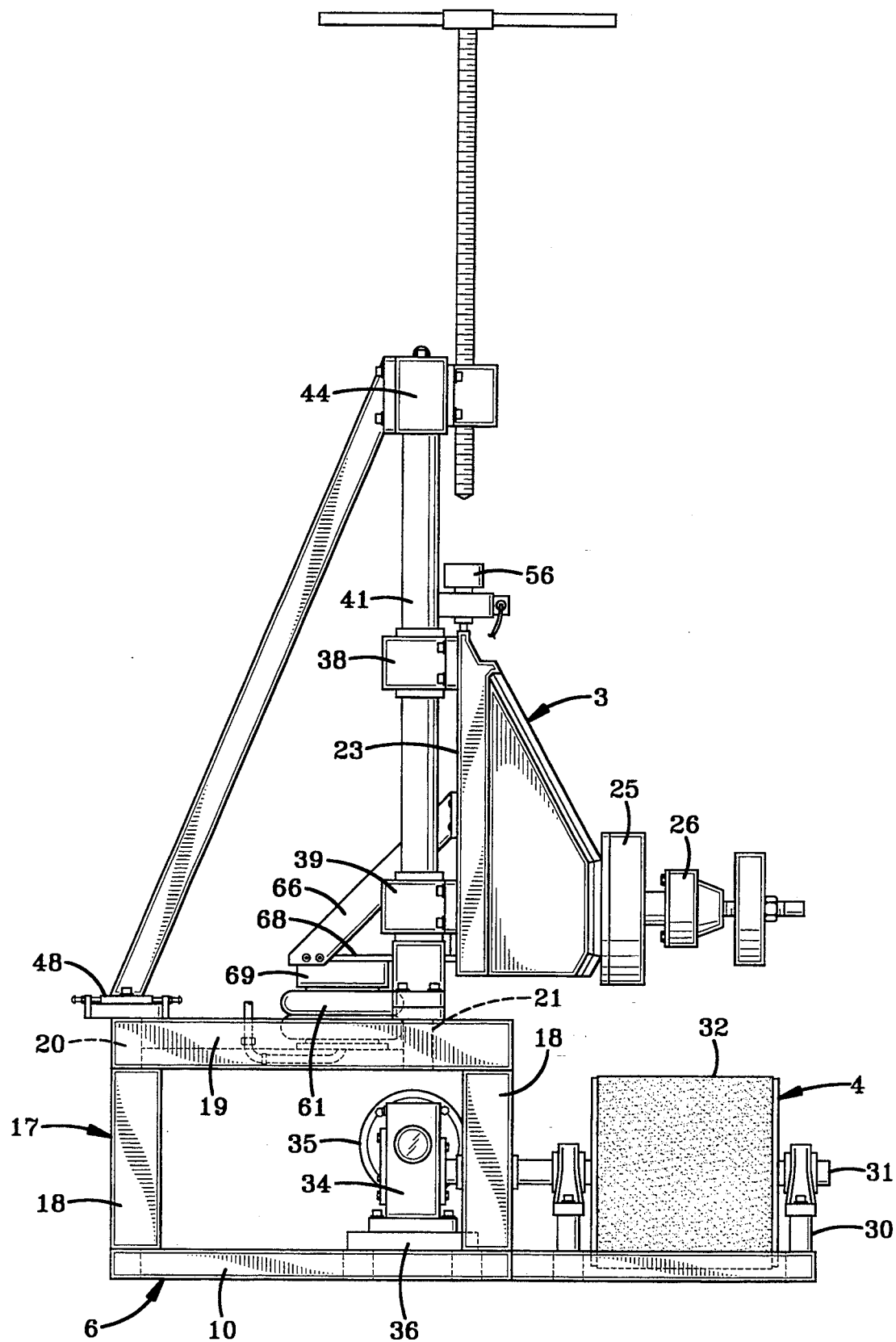
FIG. 5 is a left side elevational view of the test machine, as shown in FIG. 2.

A power-actuated lift mechanism, indicated generally at 60, is mounted between wheel mounting plate 3 and subframe 17 for ease of raising and lowering mounting plate 3 for the mounting and removal of a tire/wheel assembly thereon. In the preferred embodiment, lift mechanism 60 includes a pneumatic air spring 61 which is connected by a supply tube 62 to a remote source of compressed air. Air spring 61 is operatively connected to mounting plate 3 by a strut assembly, indicated generally at 65 (FIG. 4).

Strut assembly 65 includes a pair of spaced parallel angularly extending struts 66 which are attached at 67 to back surface 23 of mounting plate 3, and at their lower end, to a horizontal plate 68 which extends between spaced struts 66. An upper end cap or end member of the air spring 61 is connected to an inverted U-shaped plate 69 which is mounted on the bottom surface of plate 68. The pneumatic control lines for air spring 61 preferably are connected to a manually operated ON/OFF control valve 72 mounted adjacent the end of cross member 44 for ease of operation by the operating personnel when loading and unloading tire 58 onto and off of mounting plate 3. Other types of lift mechanisms can be used instead of air spring 61, such as hydraulic or pneumatic cylinders, mechanical or electrical devices, etc. without departing from the invention.

If desired, a second load cell 73 may be mounted on tire rim backing plate 25, and in the preferred embodiment, is of the type which will measure forces acting upon the tire in five axes, namely, up and down radial forces, lateral forward and back radial forces, and a twisting moment on the tire. Load cells 56 and 73 are connected by power lines 75 and 76, respectively, to processing unit 5. Processing unit 5 may consist of a usual computer 77 having a keyboard 78 and a monitor 79 which will provide a graphic display of the tire uniformities.

A usual sensing probe 80 (FIG. 1) is mounted on the end of an arm 81 which extends outwardly from an adjustable stand post 82 that extends upwardly from a base 83. Probe 80 also supplies test data and readout signals through a line 84 to processing unit 5, principally detecting the roundness of the tire.

Figure 6:
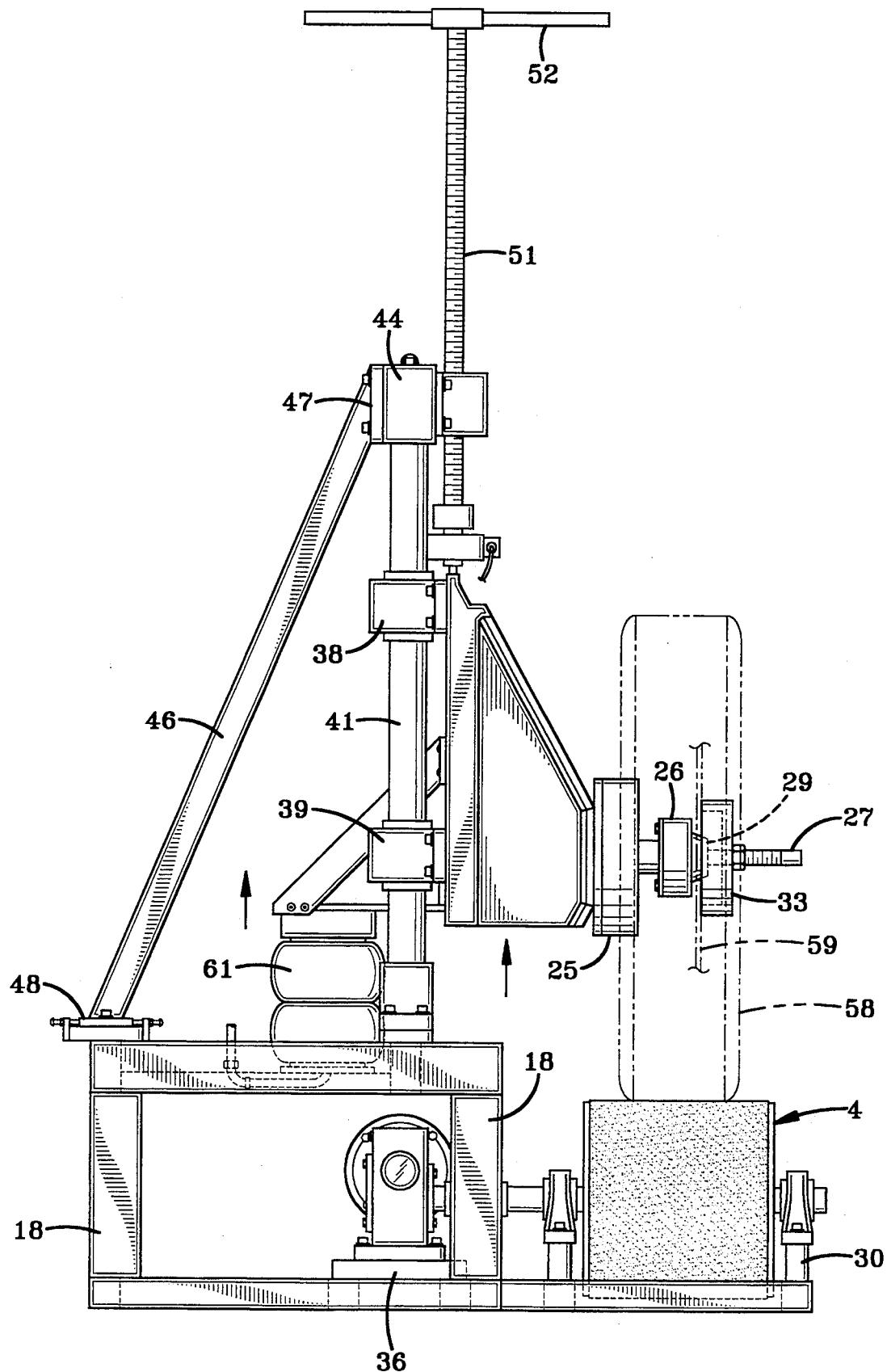
FIG. 6 is a view similar to FIG. 5 showing the test machine in operating position with a tire/wheel assembly being shown in dot-dash lines.

In operation, a tire/wheel assembly 57, which includes tire 58 and a rim 59, is clamped on bearing hub assembly 26 by locking hub 33. Valve 72 then is operated to relieve the pressure in air spring 61, permitting mounting plate 3 and the tire/wheel assembly to move downwardly on slide rods 41 until tire 58 comes into contact with road wheel 4, as shown in FIG. 6. Handle 52 then is rotated, applying a predetermined force onto mounting plate 3 and, correspondingly, between tire 58 and road wheel 4. The amount of this applied force is detected by load cell 56 and supplied to processing unit 5 through signal line 75. Motor 35 then is rotated at a constant speed revolving tire 58 by the frictional engagement with the roughened surface of road wheel 4.

A three-position switch 71 is mounted on cross member 44 to operate motor 35 and road wheel 4 in forward, reverse and OFF modes. The radial runout probe 80 is located at the optimal distance from the center of the tire, and after the computer program is initiated, a once-per-revolution trigger from an encoder 88 (FIG. 4) usually associated with spindle 27, starts data collection. The signals from the load cells and probe are supplied to processor 5, which stores the data and, if desired, provides an instantaneous graphical readout on monitor 79 and/or a subsequent hard copy printout thereof.

Various types of well known or easily developed software packages, similar to that being presently used with the larger fixed tire uniformity test machines, may be utilized for deriving the desired output readings.

Figure 7:
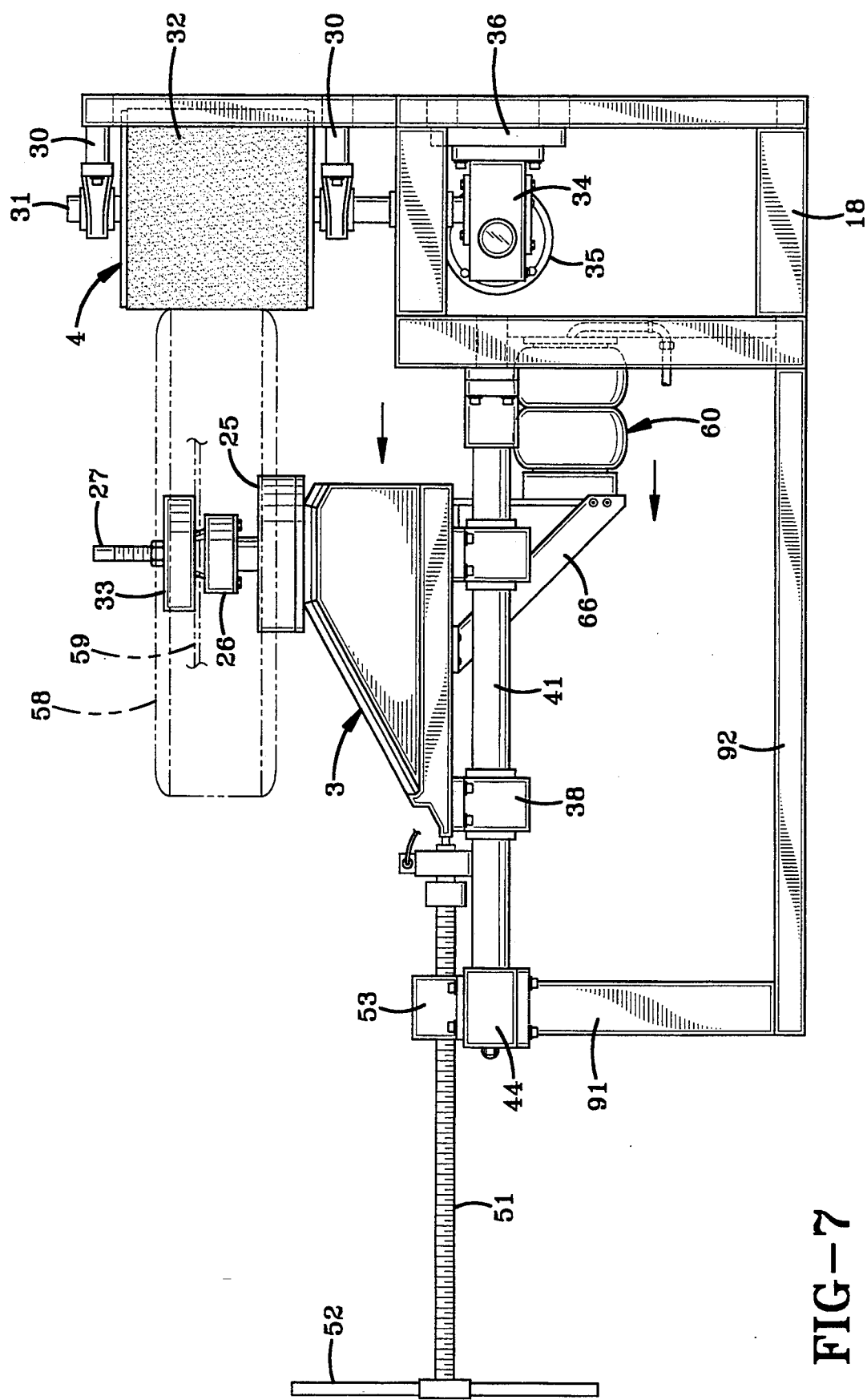
FIG. 7 is a view similar to FIG. 6 but showing a different orientation of the tire test machine.

A modified form of improved machine 1 and, in particular, of frame 2 is shown in FIG. 7. In this embodiment, a frame indicated generally at 90, which is similar in nearly all respects to frame 2, is mounted on a planar surface so that spindle 27 extends perpendicularly upwardly therefrom for placement of a tire/wheel assembly in a vertical direction thereon. When used in such an orientated position, as shown in FIG. 7, a pair of spaced vertical frame members 91 and a corresponding pair of horizontally extending frame member extensions 92 are added to frame 2 to increase the rigidity of the machine frame.

The orientation of FIG. 7 is desirable where relatively large tire/wheel assemblies are being tested, enabling the wheel assemblies to be picked up and transported and placed onto spindle 27 by an overhead crane or other transport mechanism.

In accordance with the invention, both frames 2 and 90 provide a relatively compact and sturdy construction and arrangement of frame components, which enable the road wheel and motor to be mounted thereon together with the power-operated lift mechanism, such as air spring 61, as well as providing the load cell mounting arrangements and the slide rails for the movement of tire/wheel assembly mounting plate 3 therealong, including the manually operated loading mechanism, namely, threaded shaft 51, or other type of loading mechanism. Thus, improved machine 1, using the particular frame constructions 2 and 90, enables the unit to be easily transported in a truck to a tire assembly plant or other remote locations heretofore unaccessible for testing of tire/wheel assemblies and/or of the tire or rim components thereof, eliminating the heretofore need of shipping the tire/wheel assembly or tire to a remote laboratory test site. The preferred embodiment has a total weight of between 500 and 600 lbs. and is easily moved by a forklift vehicle, which is readily available at most plant sites.

Accordingly, the improved portable tire uniformity test machine is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved portable tire uniformity test machine is constructed and used, the characteristics of the construction, and the advantageous, new and useful results obtained; the new and useful structures, devices, elements, arrangements, parts and combinations, are set forth in the appended claims.

We claim:

1. A portable machine for testing on site uniformity of tire/wheel assemblies and/or components thereof including:

a frame having a base formed by a plurality of frame members lying in a common plane for supporting the machine on a substantially horizontal planar surface, a subframe mounted on the base and extending upwardly therefrom, said subframe having a box-like configuration with corner support frame members extending upwardly from the base and a pair of transversely extending cross members extending between certain of the corner support frame members, and a slide subassembly mounted on the subframe and extending outwardly therefrom said slide subassembly including a pair of spaced parallel slide rods mounted on one of the cross members and extending vertically upwardly therefrom, and a pair of reinforcing struts extending in an acute angular relationship between the other of said cross members and the slide rods;

a tire/wheel assembly mounting plate slidably mounted on the slide subassembly;

means for moving the tire/wheel assembly mounting plate on the slide subassembly;

a road wheel rotatably mounted in a fixed position on certain of the frame members which extend outwardly beyond the box-like subframe and form a base extension;

a motor mounted on the base and drivingly engaged with the road wheel for rotating said road wheel; and load means for moving the tire/wheel assembly mounting plate toward the road wheel to apply a measurable pressure between a tire of a tire/wheel assembly mounted on said mounting plate and the road wheel.

2. The machine defined in claim 1 including first load detecting means for measuring the amount of pressure between a tire and the road wheel exerted by the load means.

3. The machine defined in claim 1 including probe means for generating a signal indicative of a magnitude and locations of a roundness of a tire.

4. The machine defined in claim 3 including electronic processing means for receiving and processing the signal from the probe means.

5. The machine defined in claim 4 in which the electronic processing means further includes display means for providing a graphical display of nonuniformities of a tire being tested.

6. The machine defined in claim 1 in which the slide subassembly further includes bearing means for slidably mounting the tire/wheel assembly mounting plate on the slide rods.

7. The machine defined in claim 1 in which the load means is mounted on the cross member of the slide subassembly and engages the tire/wheel assembly mounting plate.

8. The machine defined in claim 1 in which the load means includes a threaded shaft adapted to be manually advanced into engagement with the tire/wheel assembly mounting plate.

9. The machine defined in claim 1 in which the reinforcing struts form an included angle of approximately 25° with respect to the slide rods.

10. The machine defined in claim 6 in which the tire/wheel assembly mounting plate has a generally triangular configuration with a generally planar base and an apex; in which the bearing means is mounted on the base of said mounting plate; and in which a spindle extends outwardly from the apex and is adapted to support a tire/wheel assembly thereon.

11. The machine defined in claim 1 in which the tire/wheel assembly mounting plate includes a spindle extending outwardly therefrom for supporting a tire/wheel assembly thereon; and in which load detecting means is mounted on the spindle for measuring certain forces applied to a tire of a tire/wheel assembly by the load means and road wheel.

12. The machine defined in claim 11 in which the load detecting means includes a load cell, said cell adapted to measure forces in five axes.

13. The machine defined in claim 1 in which the road wheel is rotatably mounted by a pair of spaced bearings on said base extension.

14. The machine defined in claim 13 in which certain other of the frame members extend within the subframe; and in which the motor is mounted on said certain other frame members and is located within said subframe.

15. The machine defined in claim 1 in which a majority of the frame members are rectangular hollow-shaped members.

16. The machine defined in claim 1 including power lift means for moving the tire/wheel assembly mounting plate toward and away from the road wheel.

17. The machine defined in claim 16 in which the power lift means is an air spring; and in which said air spring is mounted on the subframe.

18. The machine defined in claim 17 in which a strut assembly is mounted on the tire/wheel assembly mounting plate and extends over the subframe; and in which the air spring is located between the subframe and strut assembly.

* * * * *